Oct. 27, 1925.   J. P. STEWART   1,559,470
DEVICE FOR FACILITATING THE COILING OF HOSE AND THE LIKE
Filed April 13, 1925
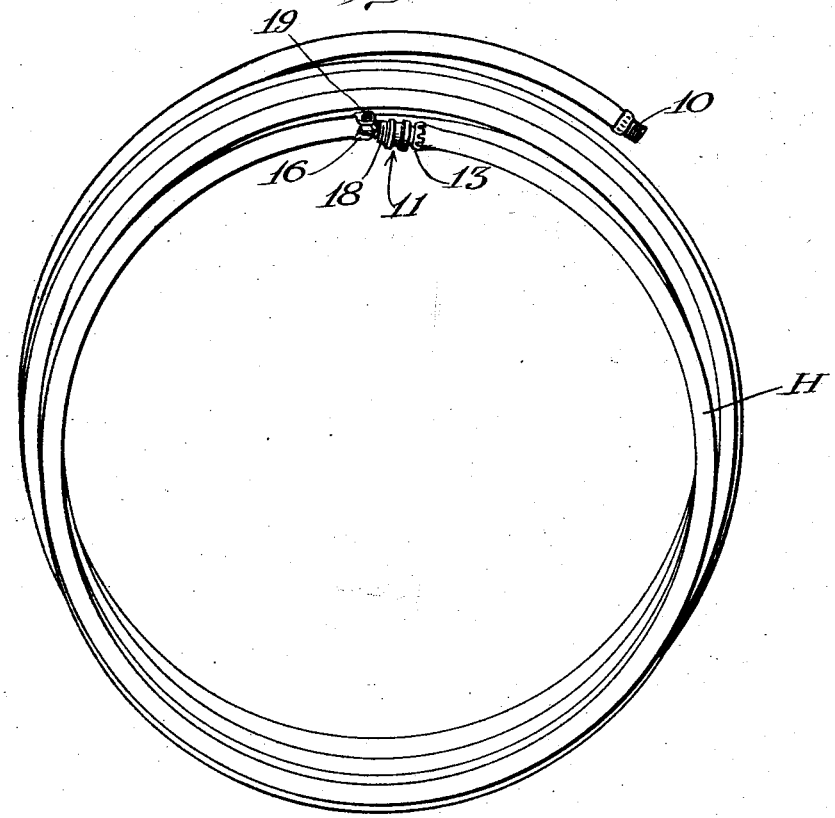
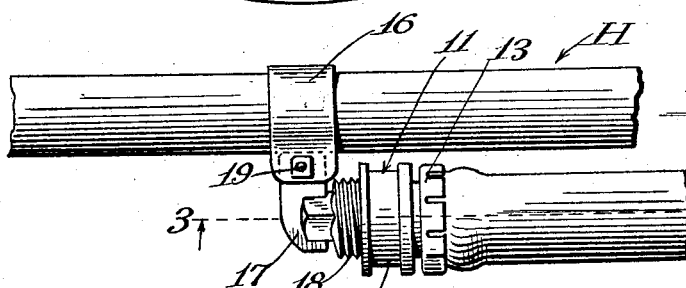
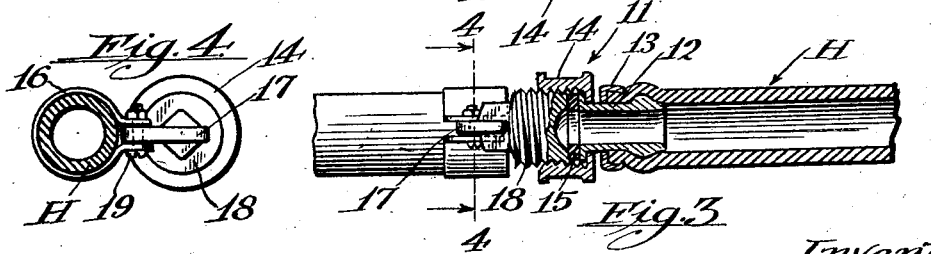
Inventor:
J. P. Stewart
By Hazard and Miller
Attorneys.

Patented Oct. 27, 1925.

1,559,470

UNITED STATES PATENT OFFICE.

JONATHAN P. STEWART, OF ALHAMBRA, CALIFORNIA.

DEVICE FOR FACILITATING THE COILING OF HOSE AND THE LIKE.

Application filed April 13, 1925. Serial No. 22,760.

*To all whom it may concern:*

Be it known that I, JONATHAN P. STEWART, a citizen of the United States, residing at Alhambra, in the county of Los Angeles and State of California, have invented new and useful Improvements in Devices for Facilitating the Coiling of Hose and the like, of which the following is a specification.

This invention relates to a device adapted to be applied to a garden hose and the like for facilitating the coiling of the hose, so that the hose may be easily and quickly coiled after using.

An object of this invention is to provide a device attachable to a garden hose having coupling members mounted upon its ends and which is adapted to be engaged by one of the coupling members in forming the initial loop of the coil, it being understood that after one end of the hose is fastened to an intermediate portion of the hose in forming the initial loop, the hose may be readily coiled by bringing other portions of the hose adjacent the closed initial loop.

With the foregoing and other objects in view which will be made manifest in the following detailed description and specifically pointed out in the appended claims, reference is had to the accompanying drawings for an illustrative embodiment of the invention, wherein:

Figure 1 is a perspective view of a garden hose to which the device is applied, shown in coiled position, Fig. 2 is a plan view of the device as applied to the hose with one of the coupling members detachably secured to the device, Fig. 3 is a section taken upon the line 3—3 of Fig. 2, and Fig. 4 is a section taken on the line 4—4 of Fig. 3.

Referring to the accompanying drawings wherein similar reference characters designate similar parts throughout, the garden hose is designated at H, having one end provided with a male coupling member 10 which is of conventional construction and exteriorly threaded, and the other end of the hose is provided with a coupling member, generally designated at 11, which is of conventional construction and interiorly threaded. The coupling member 11 constitutes the female coupling member of the hose. The coupling member 11 consists of a body 12 adapted to be inserted into the hose and fastened therein as by a clinching device 13. A ferrule 14 is rotatable upon the body 12, but cannot be removed therefrom, and is interiorly threaded. A washer 15 is usually associated with the female coupling member 11 to prevent leakage.

My invention consists of a band or clamp 16 which is adapted to be placed about the hose H intermediate its ends and at a suitable distance from the end having the female coupling member 11. Between the contiguous ends of the band 16 there is a plate 17 upon which is mounted an exteriorly threaded plug 18, which is complementary to the ferrule 14, so as to be readily engaged thereby. The plate 17 carrying the threaded plug 18 is held between the contiguous ends of the band 16 by means of a nut and bolt 19, serving to fasten or draw the ends of the band 16 together in clamping the band about the hose. As clearly shown upon the drawing, the female coupling member 11 is adapted to have the ferrule 14 threaded onto the plug 18, in this manner forming the initial loop in coiling the hose. The end of the hose bearing the female coupling member 11 is detachably secured to the hose in forming the initial loop and after the initial loop has been formed, the hose can readily be coiled by bringing the other portions of the hose adjacent those portions forming the initial loop.

It will be understood that the device is applicable to a garden hose which is to be coiled by hand or to be wound upon a reel. In using the device upon a hose which is to be wound upon a reel, the end of the hose is drawn over the drum of the reel and then fastened to the plug 18. After the end of the hose has been fastened, the reel may be readily wound without danger of the end of the hose bearing the female coupling member 11 unwinding or dangling free from the reel. The plug 18 is preferably mounted adjacent the female coupling member 11 for several reasons. By having the female coupling member 11 engage the plug 18, the washer 15 will be maintained within the coupling member without danger of becoming lost in moving the coiled hose from place to place. Furthermore, as the female coupling member is that coupling member which is used for attaching the hose to a water faucet or water pipe, the plug 18 will be disposed adjacent the water pipe and will not dig into the ground or into the lawn in moving the nozzle end of the hose over the lawn. It will be readily understood that dragging the hose over the lawn with one end fastened to the water faucet does not produce any great movement of those portions of the hose which are adjacent the water faucet and upon which the plug 18 is mounted.

It will be understood that in coiling the hose, water which may be in the hose will be caused to flow out of it. If desired, the plug 18 may be perforated or have an aperture therein to permit air to enter the coiled hose from both ends so as to dry it out. By thus providing means for facilitating the coiling of the hose so as to drive the water from it, and to permit air to enter the hose from both ends, the hose will have the water removed and will prevent rotting.

Because of the fact that one end of the hose is fastened to the body of the hose, the handling of the coiled hose is greatly facilitated as there is only one free end. It has been common experience when hose is coiled that because of the fact that there are two free ends, the handling of the hose is greatly hampered because of its awkwardness.

It will be understood that various changes may be made in the detail of construction without departing from the spirit or scope of the invention as defined by the appended claims.

I claim:

1. A device for facilitating the coiling of garden hose comprising a band adapted to encircle a garden hose, and a threaded member secured thereto having threads which are complementary to the threads on one of the coupling members on the conventional garden hose.

2. In combination with a garden hose having coupling members mounted upon each end of the hose, means mounted upon the hose complementary to one of the coupling members adapted to have the mentioned coupling member detachably secured thereto in forming an initial loop in coiling the hose.

3. In combination with a garden hose having a male coupling member mounted upon one end of the hose and a female coupling member mounted upon the other, means mounted upon the hose adjacent the female coupling member adapted to have the female coupling member detachably secured thereto in forming the initial loop in coiling the hose.

4. In combination with a hose having threaded coupling members mounted upon the ends thereof, means mounted upon the hose adapted to be threadedly engaged by one of the coupling members for detachably securing one end of the hose to said means in forming the initial loop in coiling the hose.

5. In combination with a garden hose having an interiorly threaded female coupling member mounted upon one end and an exteriorly threaded male coupling member mounted upon the other end, means mounted upon the hose adapted to be received in and threadedly engaged by the female coupling member in forming the initial loop in coiling the hose.

6. In combination with a garden hose having coupling members mounted upon the ends thereof, a band secured about the hose adjacent one end thereof, and means carried by the band complementary to one of said coupling members for detachably securing one of the coupling members thereto in forming an initial loop in coiling the hose.

In testimony whereof I have signed my name to this specification.

JONATHAN P. STEWART.